United States Patent Office 2,713,501
Patented July 19, 1955

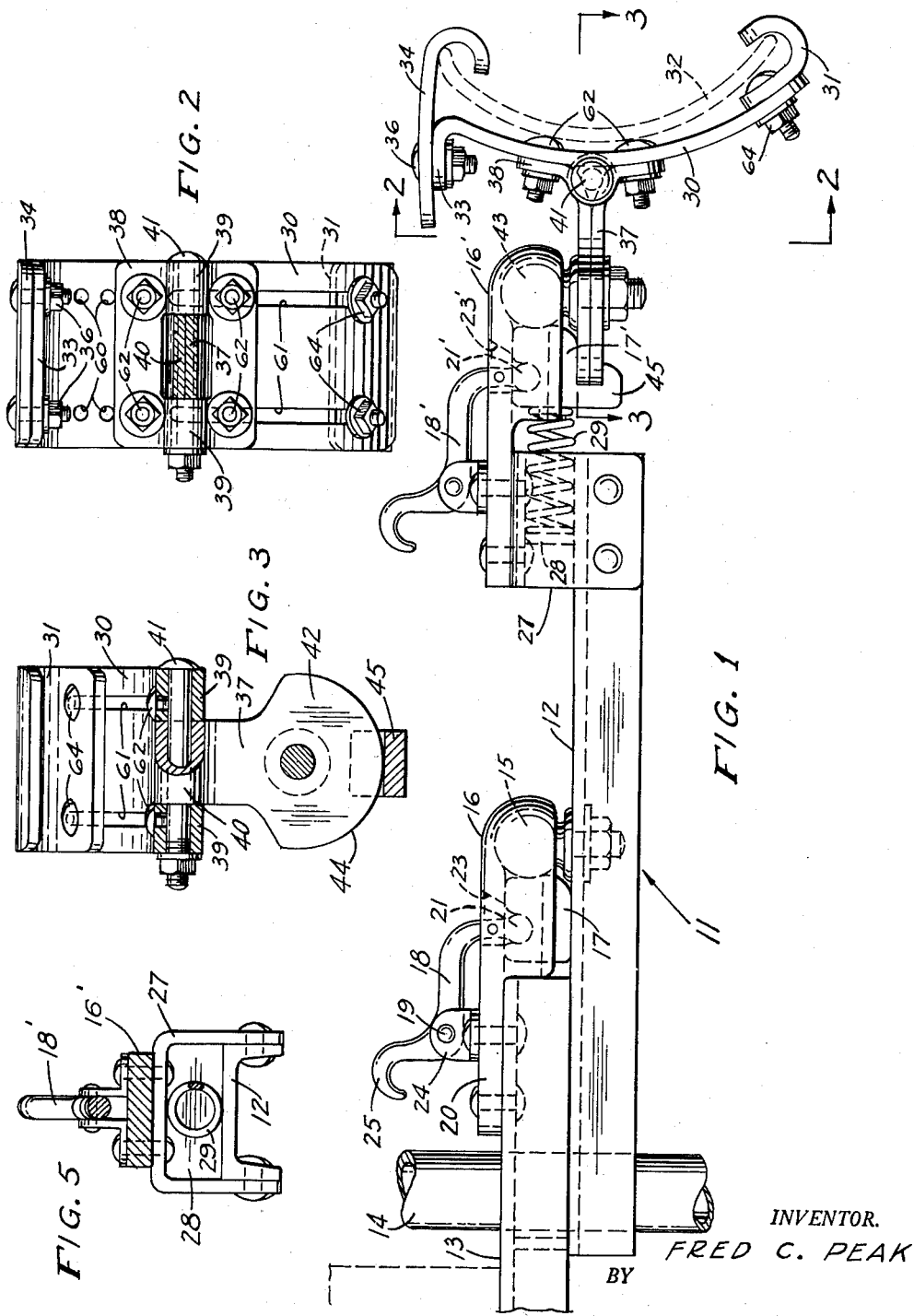

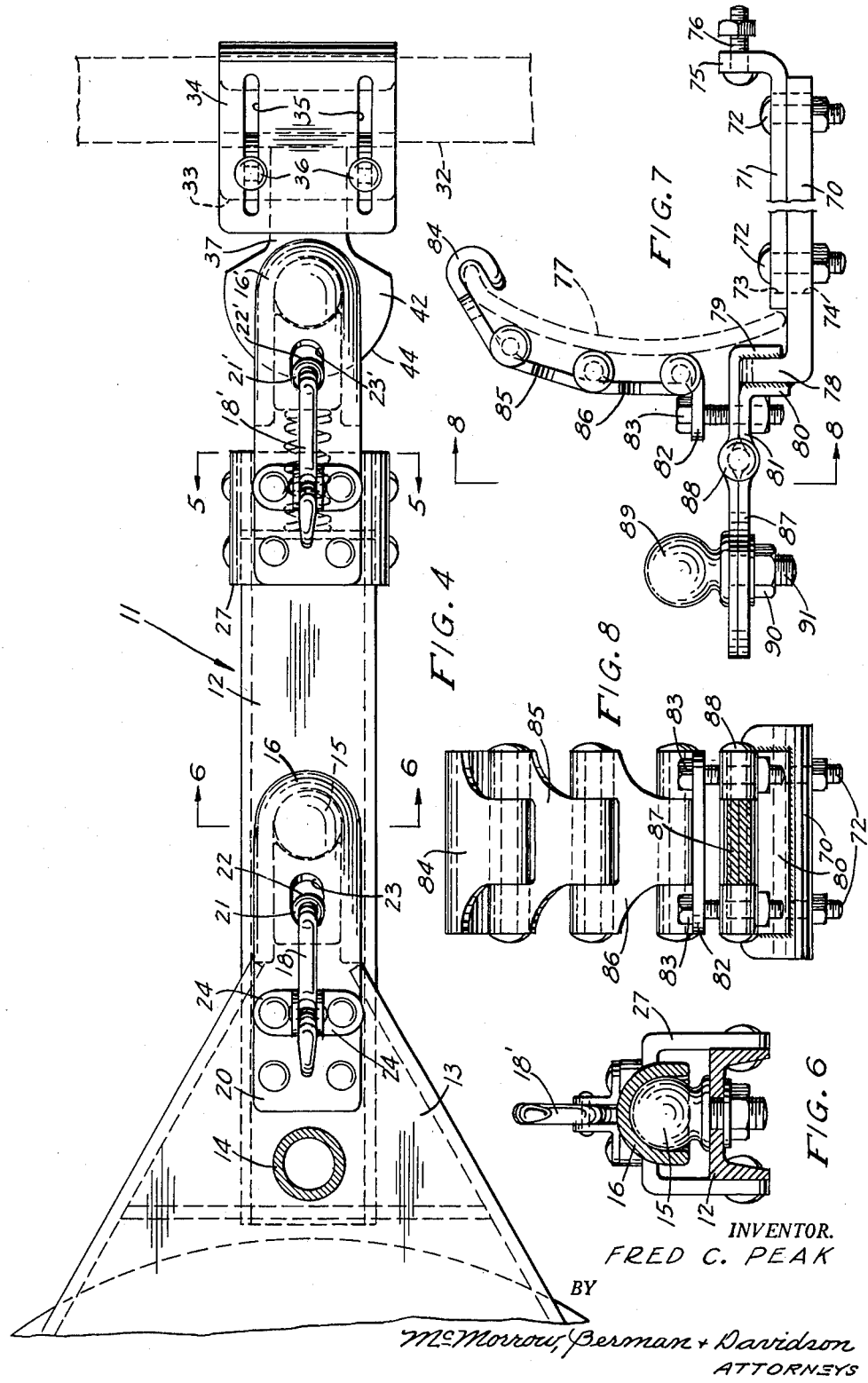

2,713,501

COMBINATION TRAILER HITCH AND SWAY ELIMINATOR WITH COUPLER AND HINGED BALL PLATE

Fred C. Peak, Monterey, Calif.

Application November 26, 1954, Serial No. 471,225

3 Claims. (Cl. 280—494)

This invention relates to coupling devices, and more particularly to an improved trailer hitch or coupling means for use in coupling a trailer to a tractor vehicle.

The main object of the invention is to provide a novel and improved trailer hitch which is simple in construction, which is easy to install, and which provides improved flexibility in the connection between the trailer and the tractor vehicle, whereby damage to the hitch mechanism is avoided when the tractor vehicle abruptly changes its angular position, as when making a steep ascent or descent, relative to the trailer vehicle.

A further object of the invention is to provide an improved trailer hitch which is inexpensive to fabricate, which is rugged in construction, and which prevents excessive sway of the trailer vehicle with respect to the tractor vehicle, while at the same time allowing ample flexibility in the connection between the trailer and tractor vehicle in a vertical plane.

Further objects and advantages of the invention will become apparent from the following description and claims, and from the accompanying drawings, wherein:

Figure 1 is a side elevational view of an improved trailer hitch assembly according to the present invention, shown in operative position for making a connection between a luggage trailer chassis and the rear bumper of the tractor vehicle.

Figure 2 is a vertical cross sectional view taken on the line 2—2 of Figure 1.

Figure 3 is a horizontal cross sectional view taken on the line 3—3 of Figure 1.

Figure 4 is a top plan view of the hitch structure of Figure 1.

Figure 5 is a transverse vertical cross sectional view taken on the line 5—5 of Figure 4.

Figure 6 is a transverse vertical cross sectional view taken on the line 6—6 of Figure 4.

Figure 7 is a side elevational view of a modified form of trailer hitch assembly adapted for use with a house trailer, for connecting the house trailer to the rear portion of a passenger vehicle.

Figure 8 is a vertical cross-sectional view taken on line 8—8 of Figure 7.

Referring to the drawings, 11 generally designates one form of the improved trailer hitch structure. The hitch structure comprises a drawbar 12 which may be channel-shaped or box-shaped in cross section, as shown in Figure 6, said drawbar being engageable beneath the hitch tongue 13 of a trailer vehicle, and being adapted to be coupled thereto, as by the vertical hitch post 14, forming part of the trailer chassis. The drawbar 12 has secured to its intermediate portion the hitch ball 15 which is engageable in a downwardly facing socket 16 secured on the hitch tongue 13 of the trailer, as shown in Figures 1 and 6. The socket 16 has the downwardly facing channeled cross section shown in Figure 6, whereby a locking block 17 is slidably housed in the socket rearwardly of the ball 15, said block 17 being retained in the socket by being supported on the top surface of the drawbar 12, as is clearly shown in Figure 1. The locking block 17 is movable rearwardly, when it is desired to disengage the socket 16 from the ball 15, and is retained in its forward locking relationship with the ball 15 by a locking lever 18 pivoted at 19 to the securing flange 20 of the socket 16, as shown in Figure 1, said lever 18 having a depending locking arm 21 which is engageable through a slot 23 in the top wall of the socket 16 and which is arranged to lockingly engage in a locking recess 22 formed in the block 17 to retain the block in the position thereof shown in Figure 1, namely, in engagement with the ball 15.

As shown in Figure 1, the lever 18 is pivoted between upstanding brackets 24, 24 secured on the attaching flange 20 of the socket 16 and is formed with the hook-like handle portion 25 which is employed for manually rotating the lever 18 whenever desired.

It will be noted that since the ball 15 is located substantially at the intermediate portion of the drawbar 12, the connection provided by the socket 16 and ball 15 cooperates with the connection provided at the post member 14 to rigidly hold the drawbar 12 against side sway relative to the trailer vehicle. At the same time, the draw bar 12 may be disconnected from the trailer vehicle by releasing the block 17, as by rotating the lever 18 counterclockwise, as viewed in Figure 1, allowing the ball 15 to be disengaged from the socket 16, and thereafter allowing the drawbar 12 to be disengaged from the post member 14.

Designated at 27 is an inverted U-shaped bracket member which is secured to the depending side flanges of the drawbar 12 at the forward end of said drawbar, defining a recess in which is secured a transversely extending partition plate 28. Secured to the top wall of the bracket member 27 is a socket member 16' generally similar in construction to the socket member 16, said socket member 16' having pivotally mounted thereon the locking lever 18' similar to the locking lever 18. Slidably positioned in the downwardly facing channel portion of the socket 16' is a locking block 17' which is biased forwardly by a coiled spring 29 disposed in the bracket member 27, one end of the spring bearing against the transverse plate member 28 and the other end of said spring bearing forwardly against the locking block 17'. The lever 18' is provided with the depending locking arm 21' which is engageable through a slot 23' in the top wall of the socket 16' and which is lockingly receivable in a recess 22' formed in the top portion of the locking block 17'.

Designated at 30 is an arcuate bracket member having secured to its bottom edge a hook element 31 engageable around the bottom edge of the tractor vehicle rear bumper 32. Adjustably secured to a top flange 33 on the bracket member 30 is a hooked plate 34 engageable around the top edge of the bumper 32, as shown in Figure 1. The hooked plate 34 is formed with the parallel slots 35, 35 through which extend the clamping bolts 36, 36, said bolts extending through the flange 33 of the arcuate bracket member 30, as shown in Figures 1 and 4, whereby the hooked plate 34 may be secured in adjusted position relative to the bracket member 30 so as to securely engage the bumper 32.

Designated at 37 is a plate member which is hinged to the intermediate portion of the arcuate bracket member 30 for rotation on a transverse axis, for example, by means of a hinge bracket 38 secured to the arcuate bracket 30, said hinge bracket 38 being formed with the transversely aligned hinge sleeves 39, 39. The plate member 37 is formed with a hinge sleeve 40 which is receivable between the spaced sleeve elements 39, 39, as shown in Figure 3, whereby a transversely extending horizontal hinge pin 41 may be engaged through the aligned sleeves 39, 39 and 40 to provide the aforesaid hinge connection between the plate member 37 and the intermediate portion of the arcuate bracket 30.

Secured on the enlarged forward portion 42 of the plate member 37 is the hitch ball 43 which is receivable in the socket 16', said enlarged forward portion having the arcuate forward edge 44. The locking block 17' is formed with a depending hook-like member 45 adapted to receive the arcuate edge 44 of the plate member 37, in the manner shown in Figure 3, whereby the forward portion 42 of the plate member 47 is supported, while at the same time pivoting of the plate member with respect to the socket 16' around the vertical axis of the ball 43 is permitted.

Since the hinge connection at 41 between the plate member 37 and the bracket 30 allows the drawbar 12 to swing in a vertical plane relative to the bracket member 30, there is sufficient vertical flexibility in the hitch connection between the trailer and the tractor vehicle to allow the trailer or tractor vehicle to be angled sharply, in accordance with sudden changes in inclination of the roadway or pavement, without imposing excessive bending strains or stresses on the hitch mechanism, thus preventing damage to the hitch device under such circumstances.

At the same time, horizontal flexibility is provided by the provision of the pivotal connection at the hitch ball 43, allowing the drawbar 12 to swing in a horizontal plane around the vertical axis of the hitch ball. Excessive side sway of the drawbar 12 and of the trailer vehicle is prevented by the provision of the cooperating connections between the ball 15 and its associated socket 16 and the connection of the drawbar 12 to the trailer chassis at the post member 14.

As shown in Figure 2, the hinge bracket 38 is adjustably secured to the arcuate bracket member 30, as by the provision of spaced fastening openings 60 in the upper portion of the bracket member 30 and by the provision of the parallel slots 61, 61 in the lower portion of said bracket member 30. The upper fastening bolts 62 connecting the hinge bracket 38 to the upper portion of the arcuate bracket 30 are engaged through selected openings 60, whereas the lower fastening bolts 62 pass through the slots 61, as shown. The lower hook element 31 is secured to the lower marginal portion of the arcuate bracket member 30 by fastening bolts 64 which are engaged through the lower portions of the respective slots 61. Thus, the position of the hook member 31 is adjustable, to conform with different designs of the rear bumpers of tractor vehicles, and the upper hooked plate 34 is likewise adjustable to such different designs. It will also be apparent that the location of the hinged connection of plate 37 relative to the arcuate bracket member 30 is vertically adjustable by the provision of the spaced openings 60 and the parallel slots 61 for the fastening bolts 62 of the hinge bracket 38.

Figures 7 and 8 illustrate a form of trailer hitch especially suitable for use with house trailers, for connecting a house trailer to the rear portion of a passenger vehicle. Designated at 70 is a relatively thick plate member on which is adjustably secured a bracket plate 71, as by bolts 72 extending through slots 73 and 74 in the bracket plate 71 and the plate member 70. At its forward end, bracket plate 71 has an upstanding flange 75 through which extend fastening bolts 76 for connecting the hitch assembly to a portion of the frame of the tractor vehicle forwardly adjacent to the rear bumper 77 thereof.

Plate 70 is provided at its rear end with an upstanding flange 78 on which is welded the depending flanges 79 and 80 of a hinge plate 81, the lower edge of the bumper 77 being receivable between the flange 79 and the rear edge of the bracket plate 71, as shown. A clamp bracket 82 is secured to hinge plate 81 by a pair of bolts 83, 83. Designated at 84 is a hook member which is engageable with the top edge of bumper 77, and which is connected to clamp bracket 82 by link plates 85 and 86, whereby said link plates engage against the bumper and are clamped thereagainst, as shown.

A hinge leaf member 87 is hinged to plate 81 for rotation on a transverse horizontal axis, as by a horizontal transverse hinge pin 88. Mounted on the leaf member 87 is a hitch ball 89 which is adapted to be received in and to be rotatably interlocked with a ball socket rigidly secured to the house trailer.

The hitch ball is secured to the plate 87 by a nut 90 engaged on the shank 91 of the ball. As will be apparent, if so desired, the position of the ball 89 may be reversed, and the ball may be positioned below the hinge plate 87 instead of above the plate as illustrated.

While certain specific embodiments of an improved trailer hitch device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a trailer hitch, a drawbar having one end portion thereof adapted to be secured to a trailer chassis, a clamp member adapted to be secured to a vehicle bumper, a plate member hinged to said clamp member for rotation on a horizontal axis, a hitch ball on said plate member, a ball socket member secured to the opposite end portion of said drawbar and being engageable over said hitch ball, a locking block slidably mounted in said socket member and being lockingly engageable with the edge of said plate member and being arranged to retain said hitch ball in said socket member, and spring means biasing said locking block toward said hitch ball and toward said edge of the plate member.

2. In a trailer hitch, a drawbar having one end portion thereof adapted to be secured to a trailer chassis, a clamp member adapted to be secured to a vehicle bumper, a plate member hinged to said clamp member for rotation on a horizontal axis, a hitch ball on said plate member, a ball socket member secured to the opposite end portion of said drawbar and being engageable over said hitch ball, a locking block slidably mounted in said socket member and being lockingly engageable with the edge of said plate member and being arranged to retain said hitch ball in said socket member, spring means biasing said locking block toward said hitch ball and toward said edge of the plate member, and a locking lever pivotally mounted on said opposite end portion of the drawbar and being lockingly engageable with said locking block.

3. In a trailer hitch, a drawbar, means adapted to releasably connect one end portion of said drawbar to a trailer chassis, further means arranged to connect the intermediate portion of the drawbar to the trailer chassis and to prevent horizontal sway of said drawbar relative to the trailer chassis, a clamp member adapted to be secured to a vehicle bumper, a plate member hinged to said clamp member for rotation on a horizontal axis, a hitch ball on said plate member, a ball socket member secured to the opposite end portion of said drawbar and being engageable over said hitch ball, a locking block slidably mounted in said socket member and being lockingly engageable with the edge of said plate member and being arranged to retain said hitch ball in said socket member, spring means biasing said locking block toward said hitch ball and toward said edge of the plate member, and a locking lever pivotally mounted on said opposite end portion of the drawbar and being lockingly engageable with said locking block.

References Cited in the file of this patent

UNITED STATES PATENTS

| | | |
|---|---|---|
| 2,260,550 | Beeson | Oct. 28, 1941 |
| 2,458,667 | Williams | Jan. 11, 1949 |

FOREIGN PATENTS

| | | |
|---|---|---|
| 127,662 | Sweden | Mar. 14, 1950 |